US012784370B1

(12) United States Patent
Cohen et al.

(10) Patent No.: US 12,784,370 B1
(45) Date of Patent: Nov. 3, 2026

(54) SYSTEMS AND METHODS FOR DATA TRANSMISSION BETWEEN ELECTRONIC DEVICES

(71) Applicant: Apple Inc., Cupertino, CA (US)

(72) Inventors: David Cohen, Longmont, CO (US); Srinivas Vedula, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 18/595,957

(22) Filed: Mar. 5, 2024

Related U.S. Application Data

(60) Provisional application No. 63/491,251, filed on Mar. 20, 2023.

(51) Int. Cl.

| | |
|---|---|
| ***G06T 19/00*** | (2011.01) |
| ***G06F 3/04815*** | (2022.01) |
| ***G06F 3/0482*** | (2013.01) |
| ***G06F 3/14*** | (2006.01) |
| ***H04L 65/1089*** | (2022.01) |

(52) U.S. Cl.
CPC .......... *G06T 19/00* (2013.01); *G06F 3/04815* (2013.01); *G06F 3/0482* (2013.01); *G06F 3/1423* (2013.01); *H04L 65/1089* (2013.01); *G06T 2200/08* (2013.01); *G06T 2200/24* (2013.01); *G06T 2219/024* (2013.01)

(58) Field of Classification Search
CPC . G06T 19/00; G06T 2200/08; G06T 2200/24; G06T 2219/024; G06T 19/006; G06F 3/04815; G06F 3/0482; G06F 3/1423; H04L 65/1089
See application file for complete search history.

(56) References Cited

U.S. PATENT DOCUMENTS

| | | | | |
|---|---|---|---|---|
| 2013/0263016 | A1* | 10/2013 | Lehtiniemi | G06Q 30/02 715/753 |
| 2018/0285052 | A1* | 10/2018 | Eade | G06F 3/1423 |
| 2018/0314484 | A1* | 11/2018 | Pahud | G06F 3/1423 |
| 2020/0066045 | A1* | 2/2020 | Stahl | G06T 19/20 |
| 2021/0287382 | A1* | 9/2021 | Lehrich | G06F 3/0346 |
| 2022/0067087 | A1* | 3/2022 | Reardon | G06F 16/638 |
| 2023/0344662 | A1* | 10/2023 | Banks | G06T 19/006 |
| 2024/0056503 | A1* | 2/2024 | Alleaume | H04L 67/141 |

* cited by examiner

*Primary Examiner* — Daniel F Hajnik
(74) *Attorney, Agent, or Firm* — Kubota & Basol LLP

(57) ABSTRACT

A first electronic device captures sensor data and generates scene data. The first electronic device transmits the scene data to an authorized second electronic device that is co-located with the first electronic device. The authorized second electronic device beneficially uses the scene data without having to regenerate the same information.

20 Claims, 10 Drawing Sheets

SYSTEMS AND METHODS FOR DATA TRANSMISSION BETWEEN ELECTRONIC DEVICES

CROSS-REFERENCE TO RELATED APPLICATIONS

This application claims the benefit of U.S. Provisional Application No. 63/491,251, filed Mar. 20, 2023, the content of which is herein incorporated by reference in its entirety for all purposes.

FIELD OF THE DISCLOSURE

This relates generally to systems and methods for sharing information between devices, and more particularly to ensuring that data may be transmitted between devices when certain criteria are met.

BACKGROUND OF THE DISCLOSURE

Electronic devices may generate and store high volumes of data. In some situations, the data can be transmitted to another electronic device to save battery and computational power of the other device.

SUMMARY OF THE DISCLOSURE

Aspects of the present disclosure relate to systems and methods for sharing information between devices. In some embodiments, an electronic device may record and generate scene data which describes features of a physical environment. In some embodiments, it may be advantageous to transmit the scene data to a second electronic device, rather than separately capturing and generating scene data on the second electronic device as these activities take time and computational resources. In some embodiments, an electronic device (e.g., a first electronic device and/or a second electronic device) includes a camera configured to capture sensor data to create scene data. In some embodiments, the electronic device may be configured to display, using a display device, the scene data. In some embodiments, the first electronic device transmits to the second electronic device the scene data captured at the first electronic device. This transmission may be in accordance with a determination that one or more criteria are satisfied including a criterion that is satisfied with a presence of the second electronic device associated with a second user different from a first user associated with the first electronic device is detected. In some embodiments, the second electronic device uses the scene data transmitted from the first electronic device in a communication session with the first electronic device.

In some embodiments, an electronic device may be configured to create scene data (e.g., first scene data) and create a three-dimensional environment using that scene data. In some embodiments, the electronic device may also be configured to receive scene data from a different device that is different than the scene data created by the electronic device (e.g., second scene data). In some embodiments, in response to receiving the second scene data, the electronic device may display, using a display device, a different three-dimensional environment generated using the second scene data.

In some embodiments, a network device stores and transmits scene data between a first electronic device and a second electronic device. In some embodiments, the network device receives scene data representing a scene from a first electronic device captured by a camera of the first electronic device. In some embodiments, the network device stores the scene data. In some embodiments, the network device receives a request from a second electronic device proximate to a location of the scene to transmit the scene data to the second electronic device. In some embodiments, the network device transmits the scene data to the second electronic device to be used in a communication session with the first electronic device. In some embodiments, transmission of the scene data occurs in accordance with a determination that one or more criteria are satisfied.

The full descriptions of these examples are provided in the Drawings and the Detailed Description, and it is understood that this Summary does not limit the scope of the disclosure in any way.

DETAILED DESCRIPTION

Figure 1A:
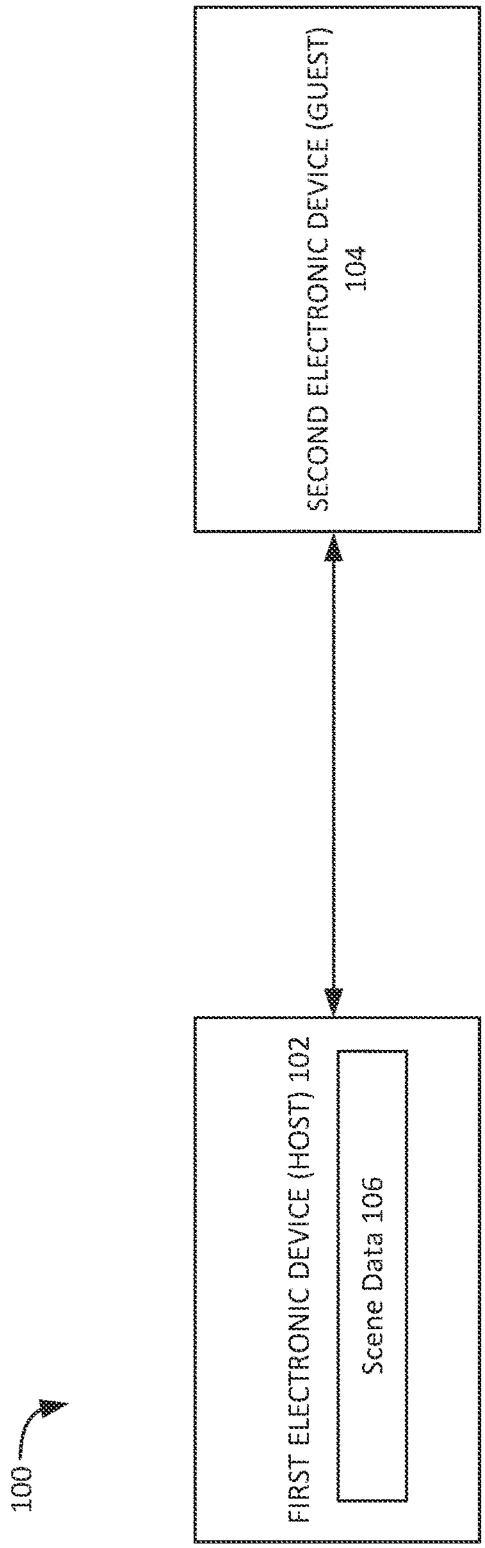
FIG. 1A is an example block diagram of a system including a first electronic device and a second electronic device.

In the following description of embodiments, reference is made to the accompanying drawings which form a part hereof, and in which it is shown by way of illustration specific embodiments that can be practiced. It is to be understood that other embodiments can be used, and structural changes can be made without departing from the scope of the disclosed embodiments.

Aspects of the present disclosure relate to systems and methods for sharing information between devices. In some embodiments, an electronic device may use image sensors to generate scene data describing features of a physical environment in which the device is located. In some embodiments, it may be advantageous to transmit the scene data to a second electronic device, rather than regenerating scene data on the second electronic device because recording and generating scene data takes time and computational resources. In some embodiments, an electronic device (e.g., a first electronic device and/or a second electronic device) includes a camera configured to capture sensor data to create scene data. In some embodiments, the electronic device may be configured to display, using a display device, the scene data. In some embodiments, the first electronic device transmits to the second electronic device the scene data captured at the first electronic device. This embodiment may be in accordance with a determination that one or more criteria are satisfied including a criterion that is satisfied with a presence of the second electronic device associated with a second user different from a first user associated with the first electronic device is detected. In some embodiments, the second electronic device uses the scene data transmitted from the first electronic device in a communication session with the first electronic device.

In some embodiments, an electronic device may be configured to create scene data (e.g., first scene data) and create a three-dimensional environment using that scene data. In some embodiments, the electronic device may also be configured to receive scene data from a different device that is different than the scene data created by the electronic device (e.g., second scene data). In some embodiments, in response to receiving the second scene data, the electronic device may display, using a display device, a different three-dimensional environment generated using the second scene data.

In some embodiments, a network device is used to store and transmit scene data between a first electronic device and a second electronic device. In some embodiments, the network device receives scene data representing a scene from a first electronic device captured by a camera of the first electronic device. In some embodiments, the network device stores the scene data. In some embodiments, the network device receives a request from a second electronic device proximate to a location of the scene to transmit the scene data to the second electronic device. In some embodiments, the network device transmits the scene data to the second electronic device to be used in a communication session with the first electronic device. In some embodiments, transmission of the scene data occurs in accordance with a determination that one or more criteria are satisfied.

FIG. 1A is an example block diagram describing a system 100 including a first electronic device 102 and a second electronic device 104 according to some embodiments of the disclosure. In some embodiments, the first electronic device 102 and the second electronic device 104 are in communication with each other, thereby enabling the devices 102 and 104 to share data with one another. For example, the first electronic device 102 shares scene data, described in more detail below, with the second electronic device 104. In some embodiments, sharing the scene data with the second electronic device 104 enables the second electronic device 104 to use the scene data without creating the scene data itself.

Example electronic devices include smart phones, portable media players, tablet computers, laptop computers, desktop computers, wearable devices, or any other suitable portable or non-portable electronic device. In some embodiments, the first electronic device 102 and the second electronic device 104 are wearable devices (e.g., a head-mounted display system). In some embodiments, and as used herein, the first electronic device 102 is referred to as a "host" device and the second electronic device 104 is referred to as a "guest" device. In some embodiments, a host device optionally generates and hosts scene data 106. In some embodiments, a guest device optionally generates and receives scene data 106. In some embodiments, the first electronic device 102 is optionally a guest device and the second electronic device 104 is optionally a host device. In some embodiments, first electronic device 102 and second electronic device 104 are designed and/or manufactured by the same device manufacturer. Additionally or alternatively, first electronic device 102 and second electronic device 104 may include operating systems and applications from the same software company (e.g., optionally the same company as the device manufacturer).

In some embodiments, scene data 106 represents a physical environment using point clouds, meshes, polygons, geometric shapes, semantic understanding metadata, and the like. In some embodiments, scene data 106 describes features of the physical environment in which first electronic device 102 and/or second electronic device 104 is located and of the location where a camera that is capturing the sensor data is located. In some embodiments, features of the physical environment include a map of the location. For example, features of the physical environment could include a detailed map of where objects are located in a room, the measurements of the objects, the measurements of the room, and the like. In some embodiments, a camera may capture sensor data that is used by the electronic devices to generate scene data 106. Semantic understanding metadata may include data relating to the type of location of the scene. For example, a user of the first electronic device 102 or the second electronic device 104 may capture the likeness of their living room using a camera associated with the first electronic device 102 or second electronic device 104, respectively. Semantic understanding metadata, in this example, would be data indicating that the scene data 106 is of a living room.

First electronic device 102 and/or the second electronic device 104 may use scene data 106 to generate a three-dimensional environment for display using a display device. In some embodiments, first electronic device 102 shares scene data 106 with second electronic device 104 so that both devices generate the same three-dimensional environment. In some embodiments, a user of the first electronic device 102 and a user of the second electronic device 104 interact with each other in the same three-dimensional environment generated by scene data 106, such as in a communication session. In some embodiments, first electronic device 102 and/or second electronic device 104 may place virtual objects in the generated three-dimensional environment. For example, as described in more detail below with reference to FIG. 2A, the first electronic device 102 and/or the second electronic device 104 uses the scene data to identify (e.g., vertical and/or horizontal) planes in the three-dimensional environment and places virtual objects in accordance with the location and orientation of the planes.

In some embodiments, the first electronic device 102 generates and transmits scene data 106 to the second electronic device 104. Transmission of scene data 106 may occur when the first electronic device 102 detects the presence of the second electronic device 104. In some embodiments, detecting the presence of the second electronic device 104 includes detecting that the first electronic device 102 and the second electronic device 104 are communicatively connected via a wireless network. Additionally or alternatively in some embodiments, the first electronic device 102 and the second electronic device 104 may be communicatively connected using other means, such as near field communications, wired network, and/or Bluetooth. In some embodiments, detecting the presence of the second electronic device 104 includes detecting that the first electronic device 102 and the second electronic device 104 are in physical proximity to each other. For example, the first electronic device 102 may detect second electronic device 104 using near-field communication (NFC) or ultra-wideband positioning (UWB). First electronic device 102 may select a second electronic device that is within a threshold distance, such as 1 cm, 5 cm, 10 cm, 50 cm, and so forth. In some embodiments, sensors in first electronic device 102 such as IMUs or image sensors can detect a physical interaction (e.g., bump) or physical proximity (e.g., camera field of view) with a second electronic device 104. This information can be used in conjunction with communications mechanisms such as NFC or UWB such that the devices can identify one another. For example, IMUs on first electronic device 102 and second electronic device 104 may detect acceleration representing a bump between the two devices and invoke a communication mechanism such as NFC for further device discovery and selection. Alternatively or additionally, and in some embodiments, detecting the presence of the second electronic device 104 includes detecting that the first electronic device 102 and the second electronic device 104 are in a communication session with each other.

In some embodiments, once the first electronic device 102 detects the presence of the second electronic device 104, the first electronic device 102 receives an indication to transmit scene data 106 to the second electronic device 104. For example, in response to receiving the indication, the first electronic device 102 may present a visual, audio, and/or tactile notification, alert, or the like that prompts a user of the first electronic device 102 to allow sharing of scene data 106. Optionally, the first electronic device 102 presents a user interface indicating a plurality of devices available for transmission of scene data 106 and receives an input corresponding to the user selecting one of the available devices. In some embodiments, in response to the input, the first electronic device 102 transmits the scene data 106 to the selected device. In some embodiments, the indication to transmit the scene data includes an activation of a setting of the first electronic device 102 set by the user, such as a scene sharing setting. In some embodiments, first electronic device 102 receives an indication from another device (e.g., phone, computer, tablet) communicatively connected to the first electronic device 102 to transmit scene data 106. The other device may have shared cloud storage or a shared user account with the first electronic device 102. The other device may transmit the indication in response to a user input directed to a user interface indication presented by the other device.

In some embodiments, after presence is detected, the first electronic device 102 optionally transmits other data to the second electronic device 104. For example, the first electronic device 102 may transmit menu data, music data, and/or home data to the second electronic device 104. For example, the first electronic device 102 may transmit home data with scene data 106 relating to a home of the user of the first electronic device 102. Home data may include data relating to passwords (e.g., Wi-Fi password) of a home. Home data may also include data relating to access of smart home devices (e.g., lights, speakers, and/or appliances). In some embodiments, the first electronic device 102 transmits music data to the second electronic device 104 in accordance with a request for sharing music from either the first electronic device 102 or the second electronic device 104. In some embodiments, music data includes data relating to a playlist that is optionally shared with users that have been granted access by an owner of the playlist (e.g., the user of first electronic device 102 or the user of second electronic device 104). In some embodiments, scene data 106 relates to a restaurant location and the first electronic device 102 optionally transmits menu data relating to the restaurant with the scene data 106.

Figure 1B:
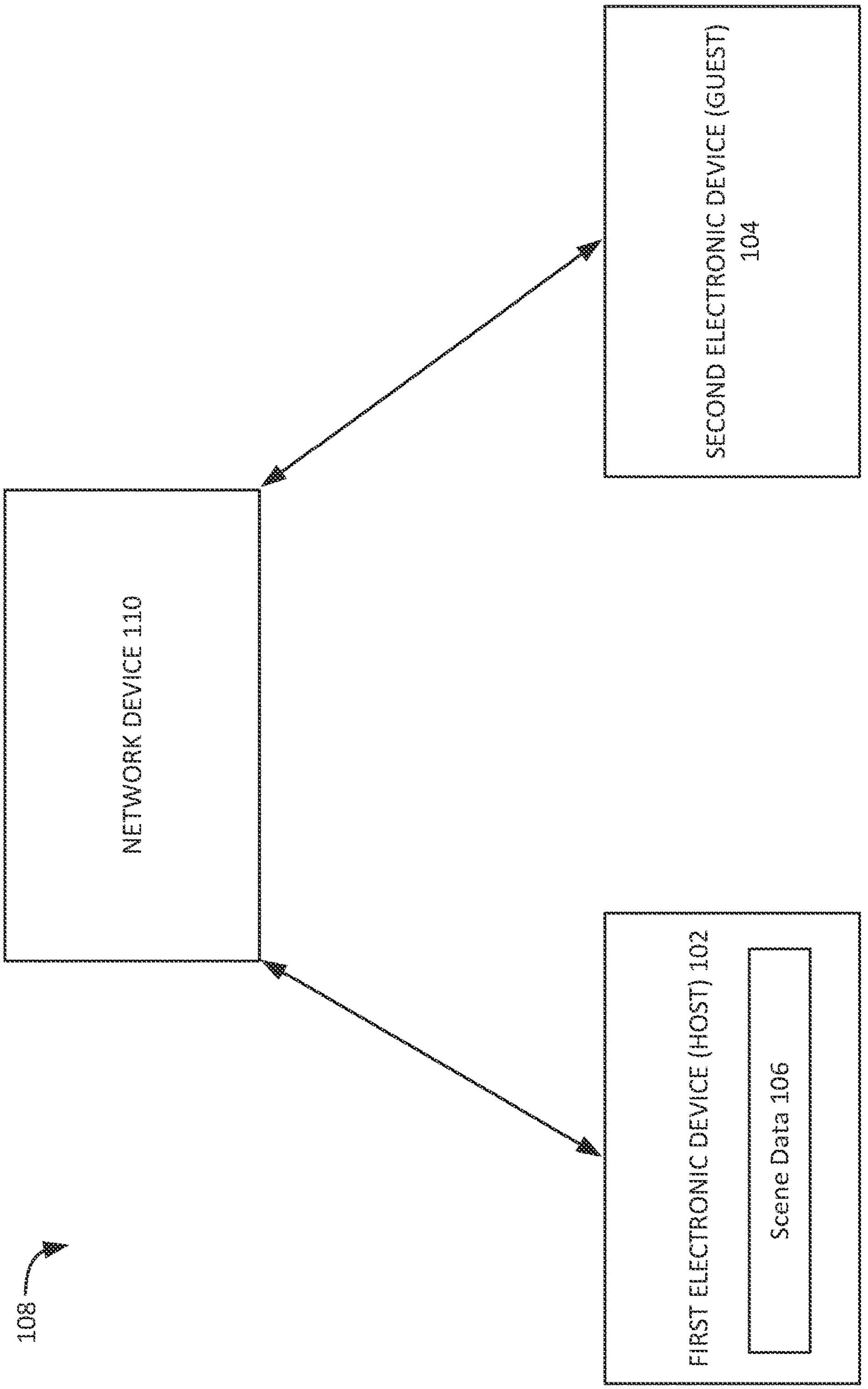
FIG. 1B is an example of a block diagram of a system including first electronic device, second electronic device, and a network device.

In some embodiments, the first electronic device 102 and the second electronic device 104 are in communication with each other using one or more communication protocols during a communication session. The communication session can include a phone call or video call, for example. In some embodiments, the first electronic device 102 can share the scene data 106 with the second electronic device 104 as part of the communication session. In some embodiments, the first electronic device 102 can share the scene data with the second electronic device 104 without being in a communication session such as a phone call or video call with the second electronic device. In some embodiments, the first electronic device 102 and the second electronic device 104 utilize direct communication (e.g., single-hop, peer-to-peer communication) without communicating through a server or other third electronic device. Direct communication can improve the speed and security of communication between the first electronic device 102 and the second electronic device 104. In some embodiments, the first electronic device 102 and/or the second electronic device 104 change the type(s) of communication protocols used, as shown in FIG. 1B.

In some embodiments, the first electronic device 102 stores and/or otherwise has access to scene data corresponding to multiple locations, including one or more locations other than the current location of the first electronic device 102 and/or second electronic device 104. In some embodiments, transmission of scene data 106 includes transmitting a first portion of scene data 106 that is associated with a current location of the first electronic device 102 and the second electronic device 104 without transmitting a second portion of scene data 106 that corresponds to one or more locations other than the current location of the first electronic device 102 and/or the second electronic device 104. For example, scene data 106 may include data related to a large space (e.g., a home, an office, or a school) and/or to multiple distinct spaces (e.g., two or more of a home, an office, and/or a school). However, in some circumstances, the first electronic device 102 transmits the portion of scene data 106 that is associated with the current location of the first electronic device 102 and/or the second electronic device 104 without transmitting other portions of the scene data. The first electronic device 102 can use semantic metadata of the scene data 106 to determine the portion of the scene data to transmit to the second electronic device 104. For example, if the first electronic device 102 and/or the second electronic device 104 are in the living room of the home of the user of the first electronic device 102, the first electronic device 102 shares scene data relating to the living room without sharing scene data related to other portions of the home.

Optionally, once the second electronic device 104 receives the scene data 106, the second electronic device 104 may modify the scene data and transmit the modified scene data 106 back to the first electronic device 102. For example, while using the scene data 106, the second electronic device 104 uses sensors (e.g., cameras and/or range sensors) to capture portions of the physical environment corresponding to the scene data 106 and updates the scene data 106 in accordance with the data captured by the sensors. Alternatively in some embodiments, second electronic device 104 may not modify the scene data 106 once received from the first electronic device 102. In some embodiments, while the second electronic device 104 is in the presence of the first electronic device 102, the second electronic device 104 is prevented from capturing new scene data and/or modifying scene data transmitted from the first electronic device 102. For example, the first electronic device 102 may prevent the second electronic device 104 from capturing or modifying scene data while in the house of a user of the first electronic device 102. In some embodiments, when the second electronic device 104 leaves the presence of the first electronic device 102, the second electronic device 104 deletes scene data 106. Alternatively, the second electronic device 104 may store the scene data 106 locally once the second electronic device 104 leaves the presence of the first electronic device 102. In some embodiments, the first electronic device 102 determines whether or not to allow the second electronic device 104 to modify the scene data 106 in accordance with a user input received during the process of pairing the first electronic device 102 and the second electronic device 104 and/or during the process of sharing the scene data. In some embodiments, the first electronic device 102 determines whether or not to allow the second electronic device 104 to modify the scene data 106 in accordance with a setting of the first electronic device 102 set by the user.

In some embodiments, scene data 106 may be encrypted using a public key of the first electronic device 102 before the first electronic device 102 transmits scene data 106 to the second electronic device 104. The first electronic device 102 may also transmit a private key to the second electronic device 104 so that the second electronic device 104 may decrypt the encrypted scene data 106. Alternatively, and in some embodiments, first electronic device 102 may encrypt scene data 106 using a secret encryption key, wherein the secret encryption key is used to encrypt or decrypt the encrypted data. First electronic device 102 may also transmit the secret encryption key to the second electronic device 104 to be used to decrypt encrypted scene data 106.

FIG. 1B is an example of a block diagram of a system 108 including first electronic device 102, second electronic device 104, and a network device 110. In some embodiments, the first electronic device 102, network device 110, and the second electronic device 104 are in communication with each other, thereby enabling the first electronic device 102 to share data with the second electronic device 104 via the network device 120. For example, the first electronic device 102 stores scene data 106 in the network device 110, and the second electronic device 104 retrieves scene data 106 from the network device 110. In some embodiments, sharing the scene data with the second electronic device 104 enables the second electronic device 104 to use the scene data without capturing the scene data itself, as discussed above.

Network device 110 may be an electronic device including smart phones, portable media players, tablet computers, laptop computers, desktop computers, wearable devices, or any other suitable portable or non-portable electronic device. In some embodiments, network device 110 may be a cloud network device such as a data server. In some embodiments, network device 110 acts as an edge node. In some embodiments, an edge node may be another device used to store data for data redundancy. In some embodiments, data may be transferred between the first electronic device 102 and an edge node directly rather than through one or more intermediate devices (e.g., server(s)). For example, an edge node may be a desktop computer. In some embodiments, network device 110 includes a storage location, such as a database. In some embodiments, first electronic device 102 and/or second electronic device 104 store scene data 106 in a storage location in network device 110. In some examples, network device 110, first electronic device 102, and second electronic device 104 are of the same design. In some examples, network device 110, first electronic device 102, and second electronic device 104 are compatible with each other and support functionality between devices. In some circumstances, first electronic device 102 and/or second electronic device 104 transmits and stores scene data 106 to a network device 110 designed and/or manufactured by the same manufacturer. Alternatively, first electronic device 102 and/or second electronic device 104 may transmit and store scene data 106 in a network device 110 that is not designed and/or manufactured by the same manufacturer. In some embodiments, the stored scene data 106 is available for later access over communication channels (e.g., wireless and/or wired communications channels and networks).

In some embodiments, first electronic device 102 transmits scene data 106 to the network device 110. Scene data 106 may be associated with the location of the network device 110. For example, if the network device 110 is located in a public location, the first electronic device 102 captures scene data related to the public location and transmits it to the network device 110. As discussed above, scene data 106 may include a first portion of scene data 106 that is associated with a current location of the first electronic device 102 and the network device 110 and/or the second electronic device 104 and a second portion of scene data 106 that corresponds to one or more locations other than the current location of the first electronic device 102 and/or the network device 110 and/or the second electronic device 104. In some embodiments, first electronic device 102 transmits the first portion of the scene data 106 without transmitting the second portion of the scene data 106. In some embodiments, the first electronic device 102 transmits the scene data 106 to the network device in response to receiving an indication at the first electronic device 102 from a user of the device. The indication may be any indication as discussed above.

Once the first electronic device 102 transmits scene data 106 to the network device 110, the second electronic device 104 may request the scene data 106 from the network device 110. For example, the network device 110 can transmit the scene data associated with a public location where the network device 110 and/or the second electronic device 104 are located to the second electronic device 104. In some embodiments, the second electronic device 104 requests the scene data 106 in the presence of the first electronic device 102 and/or the network device 110. For example, the first electronic device 102, the second electronic device 104, and the network device 110 may be in the same physical location in order for the second electronic device 104 to request scene data 106. Alternatively, the second electronic device 104 is in the presence of the network device 110 in order to request and/or receive scene data 106 without the first electronic device 102 being present. As discussed above with reference to FIG. 1A, presence may refer to physical proximity, wireless or wired connectiveness, a shared communication session, or the like. In some embodiments, scene data 106 may be encrypted using a public key of the first electronic device 102 before the first electronic device 102 transmits scene data 106 to the network device 110. The first electronic device 102 may also transmit a private key to the second electronic device 104 so that the second electronic device 104 may decrypt the encrypted scene data 106. Alternatively, and in some embodiments, first electronic device 102 may encrypt scene data 106 using a secret encryption key, wherein the secret encryption key is used to encrypt or decrypt the encrypted data. First electronic device 102 may also transmit the secret encryption key to the second electronic device 104 to be used to decrypt encrypted scene data 106. In some embodiments, the first electronic device 102 transmits the private key and/or the secret encryption key to the network device 110. In some embodiments, the network device 110 decrypts the encrypted data before sending the decrypted data to second electronic device 104. In some embodiments, the network device 110 transmits the encrypted data along with either the private key or the secret encryption key to the second electronic device 104.

Second electronic device 104 may receive scene data 106 from the network device 110. In FIG. 1B, second electronic device 104 may receive scene data 106 indirectly from the first electronic device 102. In some instances, second electronic device 104 requests and/or receives scene data 106 while in the presence of the network device 110. In this instance, first electronic device 102 may have transmitted scene data 106 to the network device 110 while the second electronic device 104 is at a different location from the location of the first electronic device 102 and/or the network device 110 and/or at a different time from the time at which the second electronic device 104 requests the scene data 106 from the network device 110. For example, the first electronic device 102 may have generated scene data 106 of a coffee shop and transmitted the scene data 106 to the network device 110. Later, the second electronic device 104 may request and receive the scene data 106 of the coffee shop when located at the coffee shop regardless of whether the first electronic device 102 is present in the coffee shop. The second electronic device 104 may receive the scene data 106 from a network device 110 that utilizes a peer-to-peer network, an edge node, or the cloud, as discussed above.

Figure 2A:
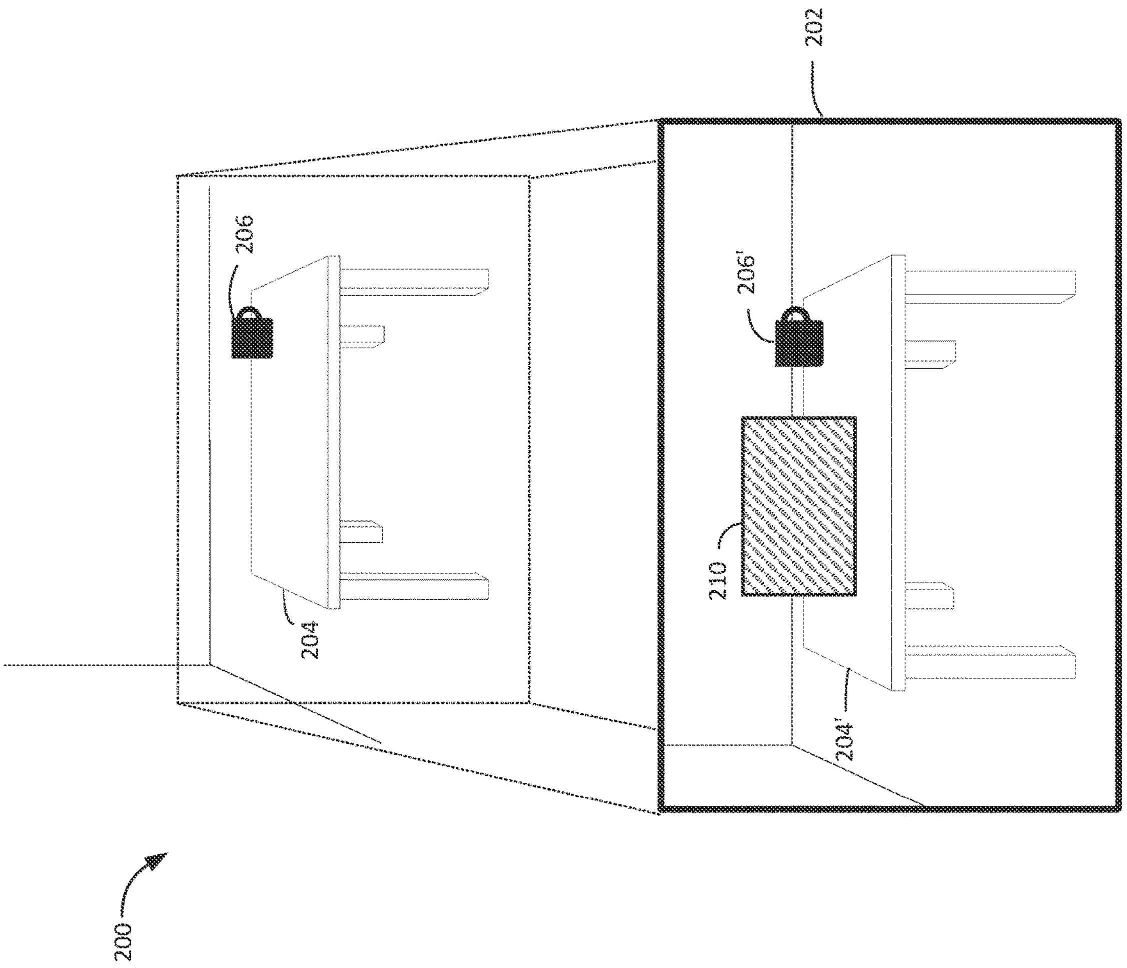
FIG. 2A is an exemplary illustration of an electronic device capturing and using scene data.

FIG. 2A is an exemplary illustration of an electronic device 202 capturing and using scene data. In some examples, electronic device 202 is a mobile device such as a tablet computer, laptop computer, smartphone, head-mounted display. Examples of electronic device 202 are described above with reference to the FIGS. 1A and 1B. In some embodiments, the electronic device 202 is the same as or similar to the first electronic device 102 and/or the second electronic device 104 described above with reference to FIGS. 1A and 1B. In some embodiments, electronic device 202 uses a camera to capture sensor data that relates to the features of the physical environment 200 to generate scene data. For example, electronic device 202 may be configured to capture features of physical environment 200 including table 204 and coffee mug 206. In some embodiments, a user of electronic device 202 captures scene data by capturing the likeness of the location using a camera. For example, electronic device 202 may capture the likeness of the objects in the location from different angles as a user moves it about the location.

In some examples, in response to an input from a user of the electronic device 202, the electronic device 202 may be configured to display a virtual object 210 (e.g., two-dimensional virtual content and/or three-dimensional virtual content) in the three-dimensional environment (e.g., represented by a rectangle illustrated in FIG. 2A) that is not present in the physical environment 200. Example virtual objects include two- or three-dimensional user interfaces, virtual representations of real objects, avatars of other users, and/or photo or video content. Virtual object 210 is displayed in the three-dimensional environment positioned on (e.g., anchored to) the top of a table 204', a three-dimensional representation of table 204.

In some embodiments, scene data may include plane data. As used herein, plane data is data about vertical and horizontal planes within scene data. For example, virtual object 210 can be displayed on the surface of the three-dimensional representation 204' of the table in the three-dimensional environment next to the three-dimensional representation 206' of the mug 206 displayed via electronic device 202 in response to detecting the planar surface of table 204 in the physical environment 200. The scene information in FIG. 2A may also include identification of other planes, such as wall(s), a floor, and/or a ceiling in the physical environment of the electronic device 202.

In some embodiments, scene data may include boundary data. As used herein, boundary data is data about virtual boundaries set up around physical objects in a location captured by scene data. Boundary data may be used to prevent a user of electronic device 202 from walking into physical objects in the physical environment 200 while viewing a computer-generated virtual reality (VR) environment or augmented reality (AR) environment. For example, scene data may include boundaries in the three-dimensional environment around the three-dimensional representation 204' of table 204 so that a user of electronic device 202 does not run into table 204 in the physical environment.

Virtual object 210 is a representative virtual object and one or more different virtual objects (e.g., of various dimensionality such as two-dimensional or three-dimensional virtual objects) can be included and rendered in a three-dimensional environment. For example, the virtual object can represent an application or a user interface displayed in the three-dimensional environment. In some examples, the virtual object 210 can represent content corresponding to the application and/or displayed via the user interface in the three-dimensional environment. In some embodiments, and as discussed above the virtual object 210 can represent menu data, music data, and/or home data. For example, the virtual object 210 may be a user interface and/or application that displays music data, such as an interface with music playlists, favorite songs, or the like. In some examples, the electronic device 202 and second electronic device 212 may be located in a restaurant or other public space. In such examples, the virtual object 210 may be a user interface and/or application that displays a menu of a restaurant. In some examples, the virtual object 210 may be a user interface and/or application that displays home data such as an interface that shows which smart lights are on/off in a home. In some examples, the virtual object 210 is optionally configured to be interactive and responsive to user input, such that a user may virtually touch, tap, move, rotate, or otherwise interact with, the virtual object. In some examples, the virtual object 210 may be displayed in a three-dimensional environment within a multi-user communication session ("multi-user communication session," "communication session"). In some such examples, the virtual object 210 may be viewable and/or configured to be interactive and responsive to multiple users and/or user input provided by multiple users, respectively. Additionally, it should be understood, that the 3D environment (or 3D virtual object) described herein may be a representation of a 3D environment (or three-dimensional virtual object) projected or presented at an electronic device.

Figure 7:
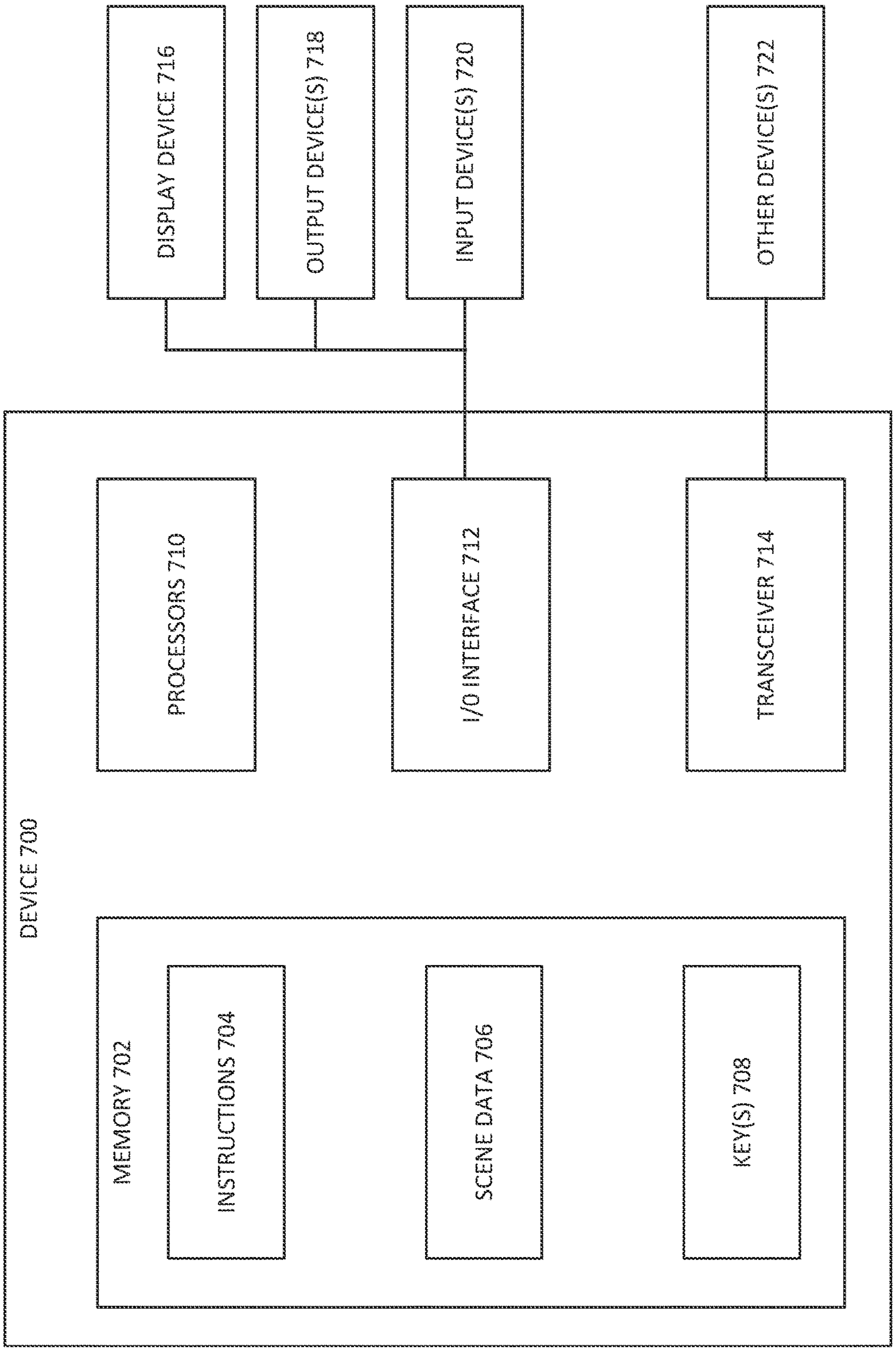
FIG. 7 is an example block diagram of an electronic device according to some embodiments of the disclosure.
Figure 8:
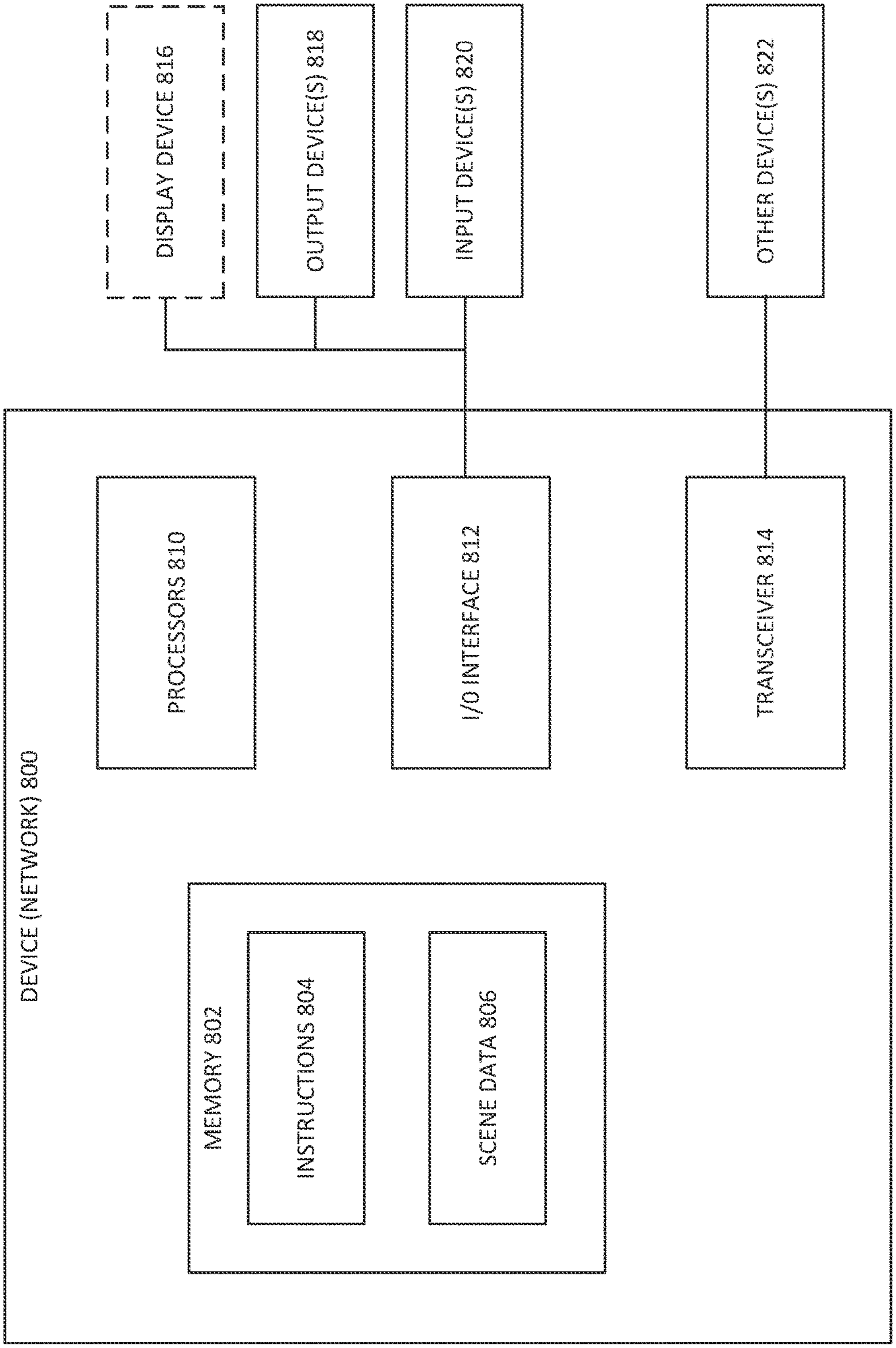
FIG. 8 is an example block diagram of an electronic device according to some embodiments of the disclosure.

In some embodiments, the electronic device 202 and/or the second electronic device 212 is in communication with a display generation component and one or more input devices, as described in FIGS. 7-8. The electronic device 202 and/or second electronic device 212 optionally is in communication with one or more other physical user-interface devices, such as touch-sensitive surface, a physical keyboard, a mouse, a joystick, a hand tracking device, an eye tracking device, a stylus, etc.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2B:
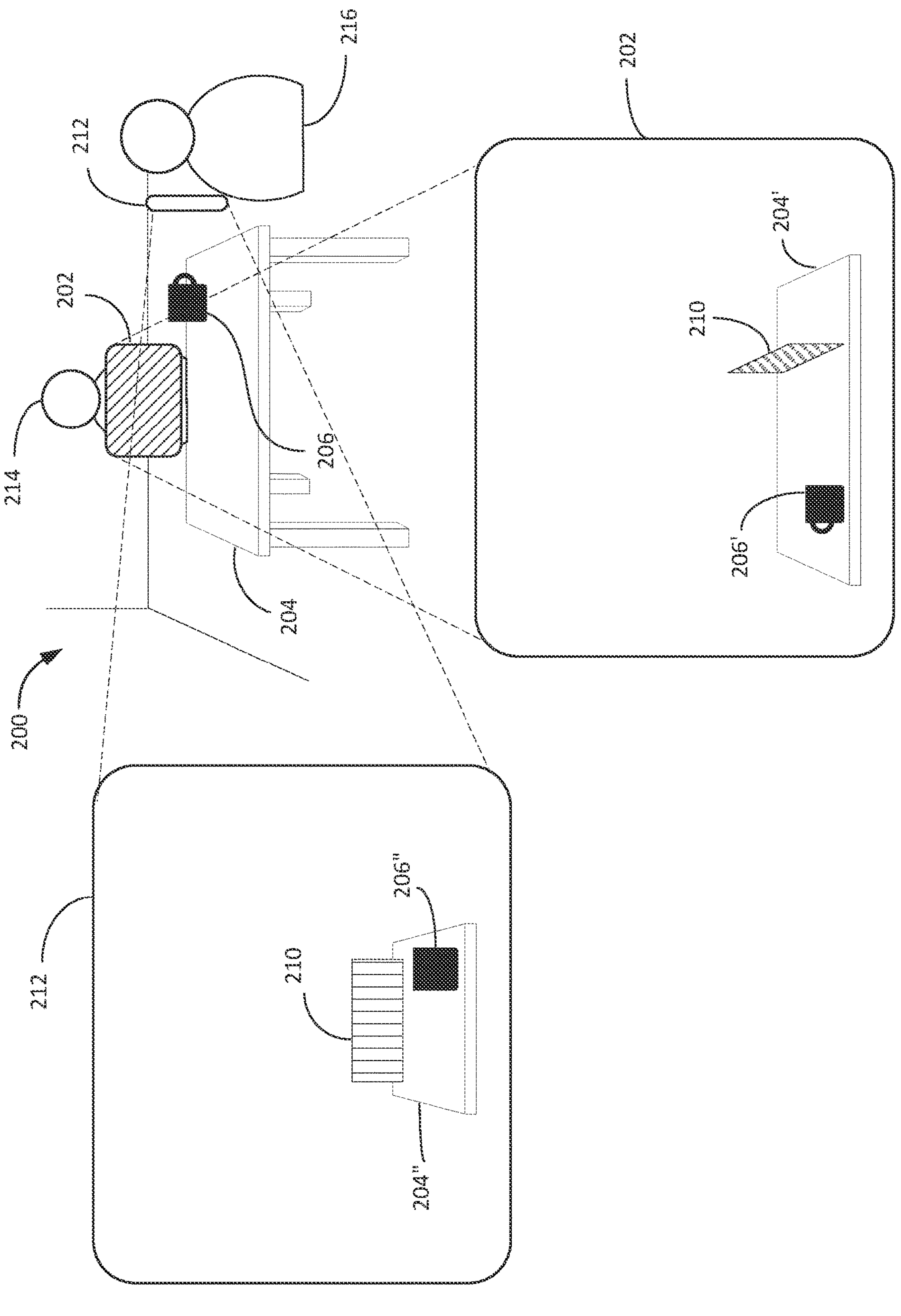
FIG. 2B is an exemplary illustration of two electronic devices showing the same scene data.

FIG. 2B is an exemplary illustration of two electronic devices using the same scene data. In some embodiments, and as discussed above, electronic device 202 may generate scene data of a location including a table 204 and a mug 206. In some embodiments, and as discussed above, electronic device 202 may directly or indirectly transmit scene data to a second electronic device 212 when the second electronic device 212 is in the presence of the electronic device 202. In some embodiments, electronic device 202 receives an indication in accordance with the second electronic device 212 receiving the scene data. In some embodiments, the indication includes an audio, tactile, and/or visual notification or alert. In some embodiments, transmitting the scene data to the second electronic device 212 allows user 214 of the electronic device 202 and user 216 of the second electronic device 212 to access the same scene data without having to generate the same scene data using the second electronic device 212. In some embodiments, the second electronic device 212 generates other scene data different than the scene data transmitted from the electronic device 202. In some embodiments, electronic device 202 displays, using a display generation component, a different viewpoint of the three-dimensional representation of physical environment 200 than second electronic device 212. For example, electronic device 202 may show the viewpoint of the three-dimensional representation of the environment based on where user 214 is positioned. This may include a three-dimensional representation 204' of a table and a three-dimensional representation 206' of a mug at the viewpoint where user 214 is looking at them. Additionally, second electronic device 212 may show the viewpoint of the three-dimensional representation of the environment, generated using scene data, based on where user 216 is positioned. This may include a three-dimensional representation 204" of the table and a three-dimensional representation 206"of the mug. The three-dimensional representation of the environment shown on second electronic device 212 may be different than the three-dimensional representation of the environment shown on electronic device 202 even though both devices share the same scene data as the devices have different viewpoints in the environment.

Additionally, and in some embodiments, while the second electronic device 212 is in the presence of the electronic device 202, the virtual object 210 is displayed in the three-dimensional environment on both electronic device 202 and second electronic device 212. As discussed above, the virtual object 210 may be viewable and/or configured to be interactive and responsive to multiple users and/or user input provided by multiple users, respectively. In some embodiments, and similar to the table 204 and the mug 206, users 214 and 216 may view the virtual object 210 at different viewpoints based on their positions relative to the virtual object 210. Additionally, and in some embodiments, either user 214 or user 216 may toggle the virtual object 210 to appear. In some embodiments, user 214 or user 216 may toggle the virtual object 210 on their electronic device while not showing the virtual object 210 on the other user's device.

Figure 3:
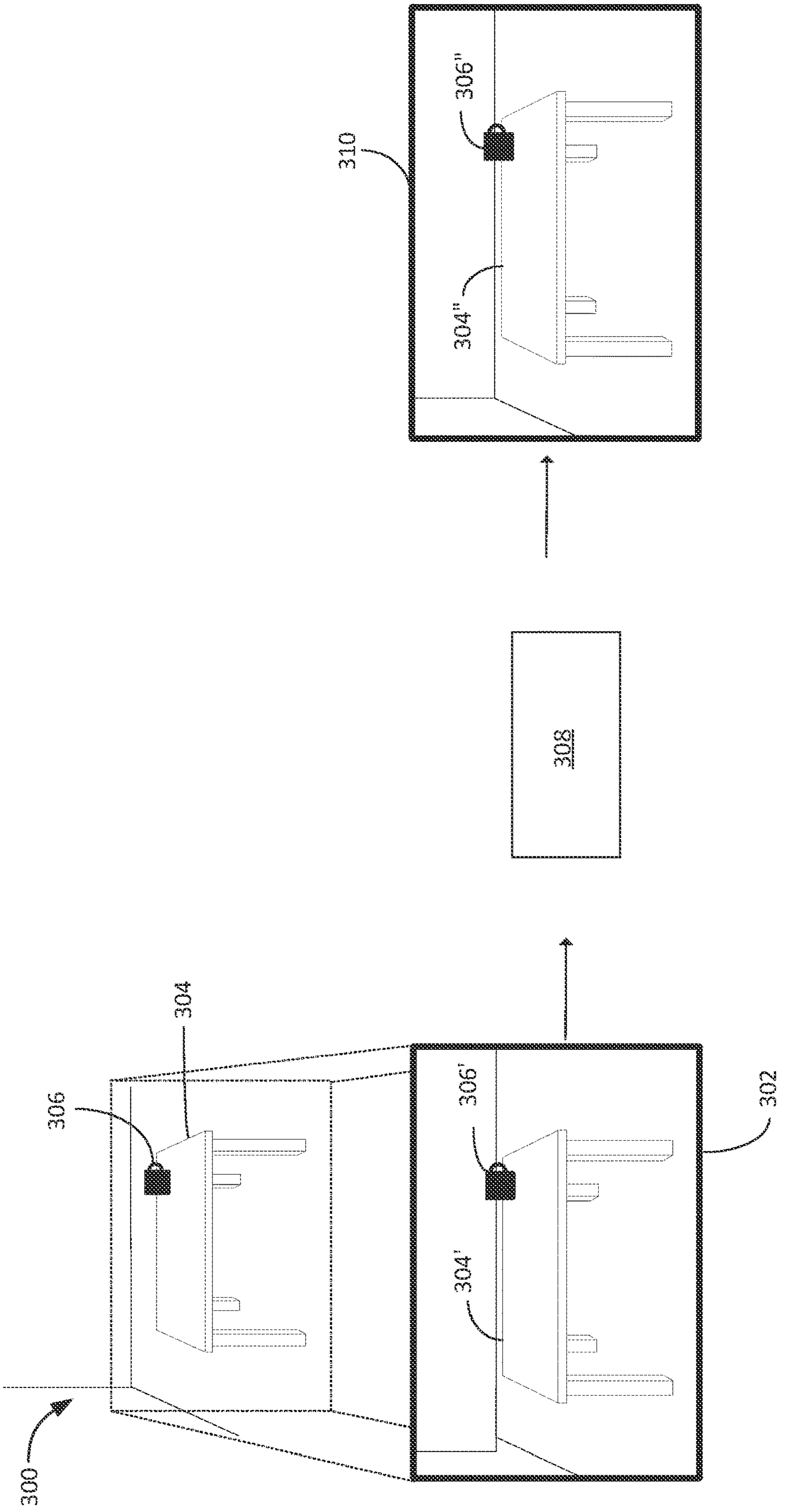
FIG. 3 is an exemplary illustration of a first electronic device transmitting scene data to a server to be transmitted to a second electronic device.

FIG. 3 is an exemplary illustration of a first electronic device transmitting scene data to a server to be transmitted to a second electronic device. The first electronic device 302 may be in a physical environment 300 including a table 304 and a mug 306, such as in accordance with FIGS. 2A and 2B. In some embodiments, first electronic device 302 may capture scene data, as discussed above in reference to FIGS. 1-2B, to be displayed on first electronic device 302 as a three-dimensional representation of physical environment 300. First electronic device 302 may transmit the scene data to a network device 308. Additional disclosure on network devices is provided in FIG. 1B. As discussed in FIG. 1B, network device 308 may be an edge node, server, or the like. In FIG. 3, network device 308 is shown as a laptop as an example, but other network devices are possible. In some embodiments, a device of the same manufacturer as first electronic device 302 and second electronic device 310 may be used as a network device 308 to store and transmit scene data. As discussed above, network device 308 may transmit scene data to second electronic device 310 while second electronic device 310 is in the presence of network device 308 and/or first electronic device 302. Alternatively or additionally, and in some embodiments, network device 308 may transmit scene data to second electronic device 310 while second electronic device 310 is at physical environment at which scene data was recorded. In some embodiments, this may occur while second electronic device 310 is not in the presence of the first electronic device 302 and/or the network device 308. Once the second electronic device 310 receives scene data, it may display a three-dimensional environment including table 304" and mug 306".

Figure 4:
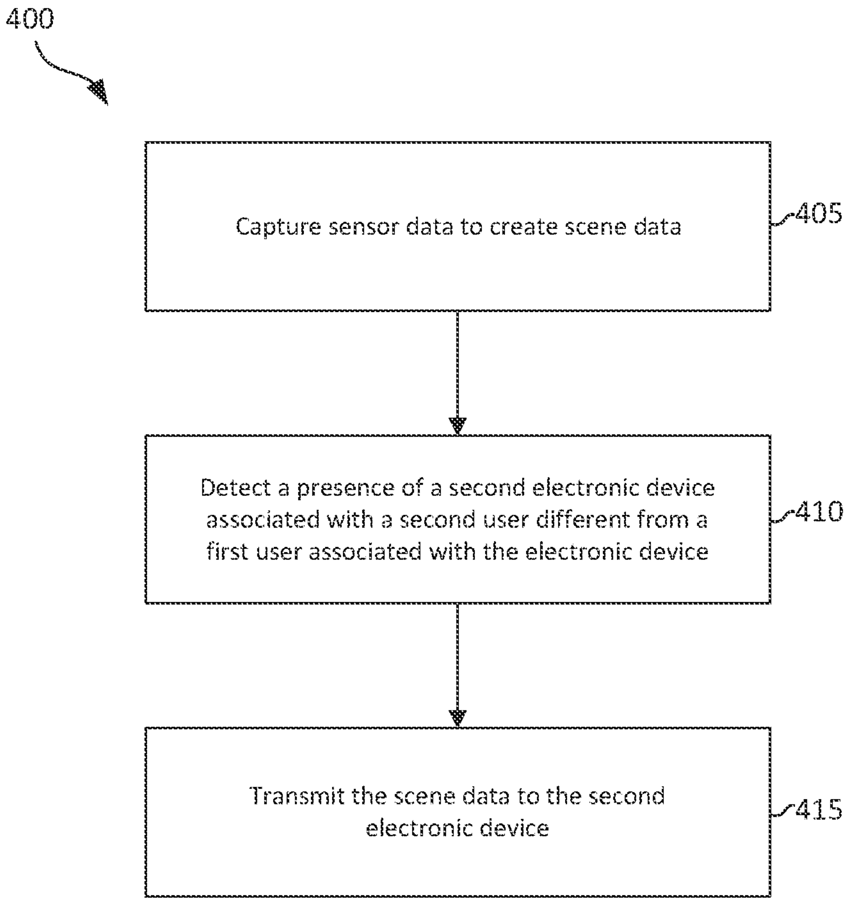
FIG. 4 is an example flowchart of a method for sharing scene data with a second electronic device according to some embodiments of the disclosure.

FIG. 4 is an example flowchart of a method 400 for sharing scene data with a second electronic device according to some embodiments of the disclosure. An electronic device (e.g., first electronic device 102 and/or second electronic device 104) may include a camera. The camera may capture sensor data to create scene data (e.g., scene data 106) at block 405. The electronic device may detect a presence of a second electronic device (e.g., second electronic device 104) associated with a second user different from the first user associated with the electronic device (e.g., first electronic device 102) at block 410. Then, the electronic device (e.g., first electronic device 102) may transmit the scene data to the second electronic device (e.g., second electronic device 104) at block 415. The second electronic device may use the scene data in the presence of the electronic device, such as in a communication session.

Figure 5:
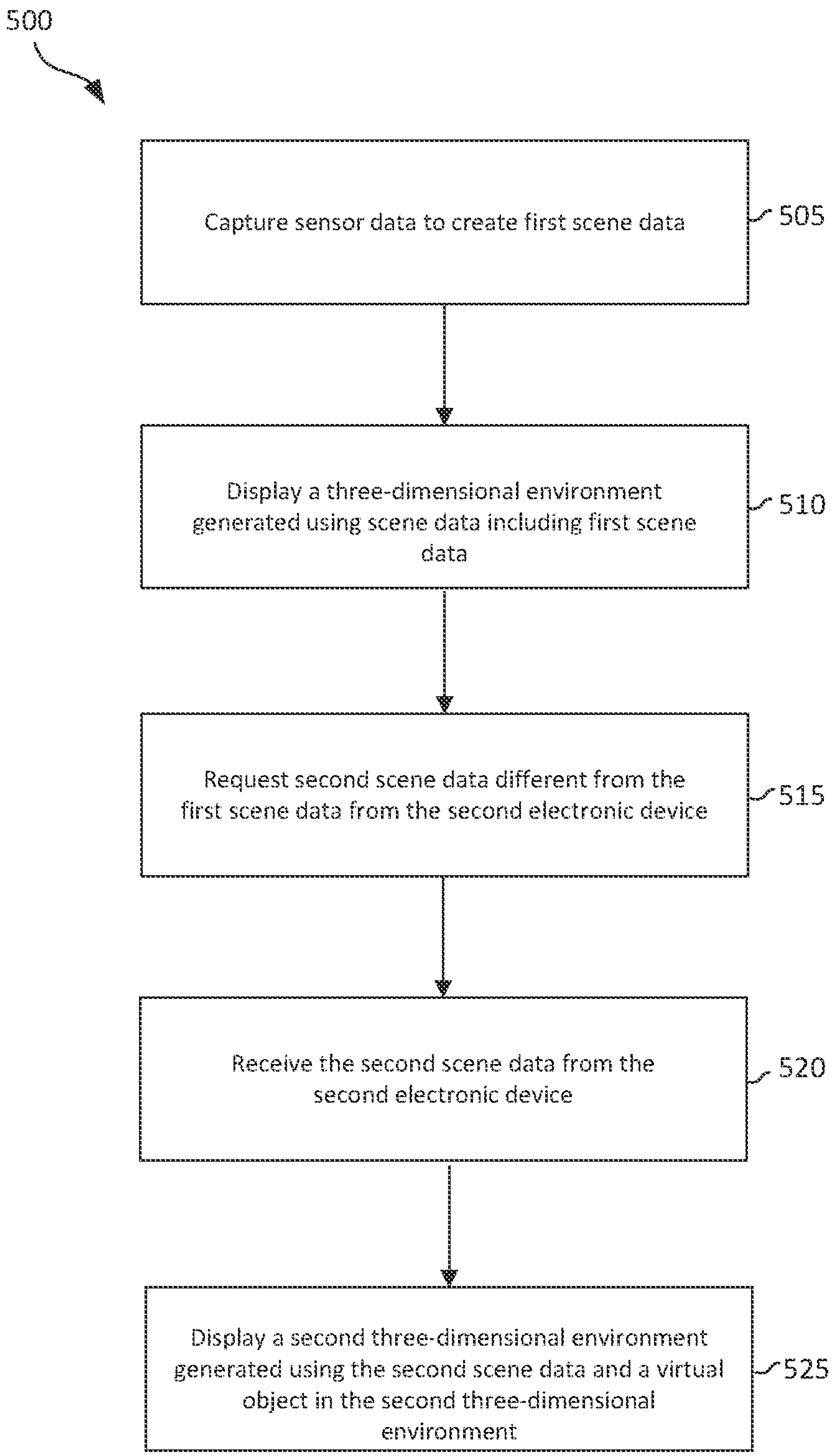
FIG. 5 is an example flowchart of a method for generating, transmitting, and displaying scene data according to some embodiments of the disclosure.

FIG. 5 is an example flowchart of a method 500 for generating, transmitting, and displaying scene data according to some embodiments of the disclosure. An electronic device (e.g., first electronic device 102 and/or second electronic device 104 described above with reference to FIG. 1) may include a camera. The camera may capture sensor data to create first scene data at block 505. The electronic device may display a three-dimensional environment (e.g., the three-dimensional environment discussed in FIG. 2A-2B) generated using scene data including first scene data at block 510. The electronic device (e.g., second electronic device 104) may request second scene data (e.g., scene data 106) different from the first scene data from the second electronic device (e.g., first electronic device 102) at block 515. After requesting the second scene data from the second electronic device, the electronic device may receive the second scene data from the second electronic device at block 520. Using the second scene data, the electronic device may display a second three-dimensional environment generated using the second scene data and a virtual object (e.g., virtual object 210) in the second three-dimensional environment at block 525.

Figure 6:
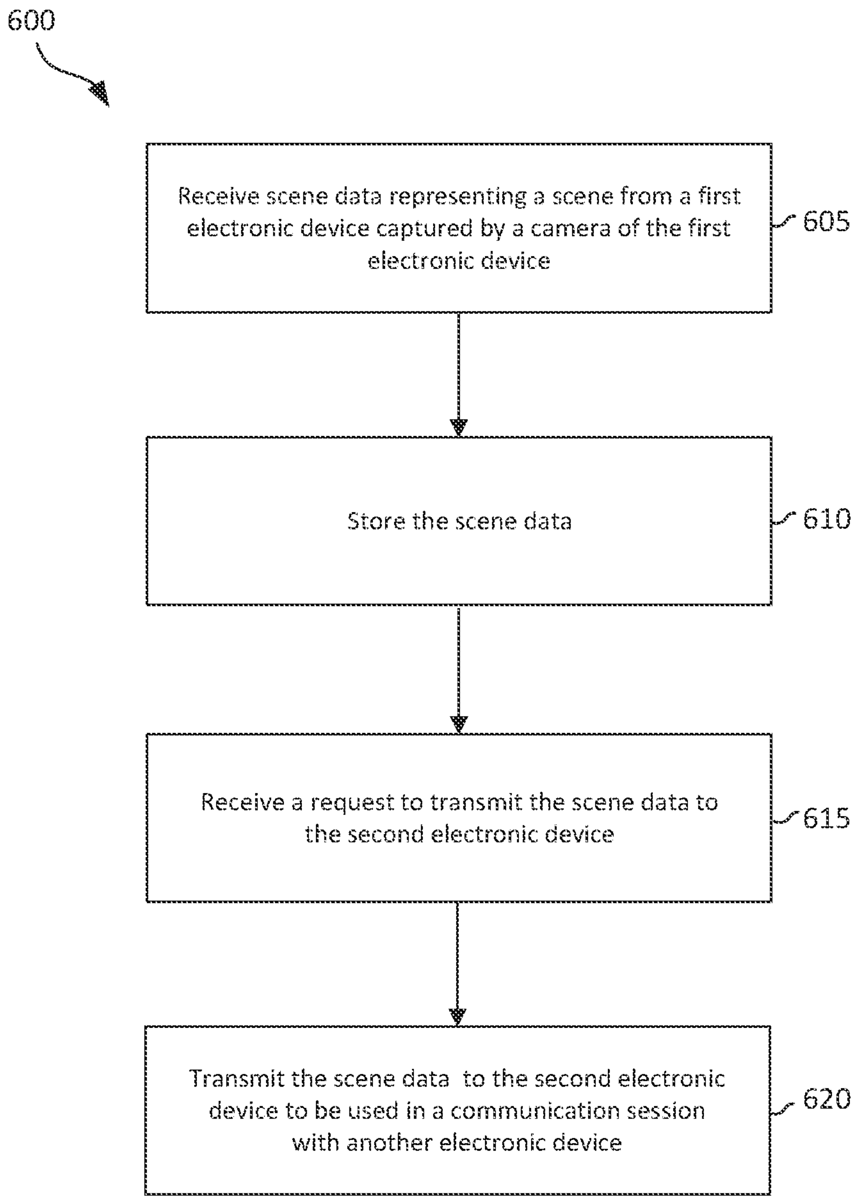
FIG. 6 is an example flowchart of method for storing and transmitting scene data according to some embodiments of the disclosure.

FIG. 6 is an example flowchart of method 600 for storing and transmitting scene data according to some embodiments of the disclosure. An electronic device (e.g., network device 110) may receive scene data (e.g., scene data 106) representing a scene (e.g., physical environment 200 and/or physical environment 300) from a first electronic device (e.g., first electronic device 102) captured by a camera of the first electronic device at block 605. The electronic device may store scene data at block 610. For example, the electronic device may store scene data in a database. The electronic device may receive a request to transmit the scene data to the second electronic device (e.g., second electronic device 104) at block 615. In some embodiments, the request to transmit the scene data may come from the first electronic device. In some embodiments, the request to transmit may come from the second electronic device proximate to a location of the scene. In some embodiments, the second electronic device is proximate to a first electronic device and/or network device. The electronic device may transmit the scene data from the database to the second electronic device to be used in a communication session with another electronic device (e.g., first electronic device 102) at block 620.

FIG. 7 is an example block diagram of an electronic device 700 according to some embodiments of the disclosure. In some embodiments, the electronic device 700 includes memory 702, one or more processors 710, an I/O interface 712, and a transceiver 714. In some embodiments, the electronic device 700 includes additional or alternative components. In some embodiments, first electronic device 102 and/or second electronic device 104 are of the same architecture as electronic device 700. In some embodiments, first electronic device 102 and/or second electronic device 104 include more, fewer, or different components than shown in the architecture as electronic device 700.

In some embodiments, memory 702 of electronic device 700 includes volatile and/or non-volatile memory implemented using electronic, electromagnetic, magnetic, infrared, optical, and/or semiconductor system(s) and/or device(s). Examples of suitable memory circuitry include random access memory (RAM) devices (e.g., static random-access memory (SRAM), double-data-rate random-access memory (DDR RAM), dynamic random-access memory (DRAM), or other high-speed RAM or solid-state RAM, etc.), flash memory devices, read-only memory (ROM) devices, or erasable or electrically erasable programmable read-only memory devices (EPROM or EEPROM). Other types of memory are possible in some embodiments. In some embodiments, memory 702 can be separate from the one or more other components of electronic device 700 and electrically coupled to the one or more other components of electronic device 700 for read and/or write operations. In some embodiments, some of memory 702 can be integrated within other components of electronic device 700.

In some embodiments, at least a portion of the memory 702 can be referred as a computer-readable storage medium. Memory 702 and/or a transitory or non-transitory computer readable storage medium of memory 702 can store instructions, programs, data structures and/or modules or a subset or combination thereof in some embodiments. In some embodiments, memory 702 and/or the computer readable storage medium can store instructions 704 and/or programs, which when executed by processors 710, can cause the electronic device 700 (or a computing system more generally) to perform one or more functions and methods of one or more examples of this disclosure, such as one or more of the methods described above with reference to FIGS. 1 through 6. As used herein, a "non-transitory computer-readable storage medium" includes any tangible medium (e.g., excluding signals) that can contain or store programs/instructions for use by the electronic device (e.g., processing circuitry), for example.

As shown in FIG. 7, additionally or alternatively, the memory 702 of electronic device 700 stores scene data 706, and one or more keys 708. In some embodiments, the scene data 706 includes scene data associated with a first user account into which the electronic device 700 is signed in. For example, signing into the first user account enables a user to use the electronic device 700 to access scene data, files, and/or programs, and enables the electronic device 700 to operate according to settings selected by a user and saved to the first user account.

As described in more detail above with reference to FIGS. 1-6, in some embodiments, the electronic device 700 collects the scene data 706 using an input device 720, discussed in further detail below. In some embodiments, the electronic device 700 stores the scene data 706 in memory 702. In some embodiments, the electronic device 700 displays a three-dimensional environment generated using scene data 706. In some embodiments, the electronic device 700 shares scene data 706 with other devices 722 using transceiver 714.

In some embodiments, the electronic device 700 receives scene data 706 from other devices 722 using transceiver 714. For example, the electronic device 700 may be consistent with the second electronic device 104 as discussed in FIGS. 1A and 1B. In some embodiments, the electronic device 700 stores the received scene data 706 in memory 702. In some embodiments, the electronic device 700 displays a three-dimensional environment generated using the received scene data 706.

As shown in FIG. 7, in some embodiments, memory 702 stores one or more keys 708. In some embodiments, the keys 708 include private keys for encrypting and accessing scene data 706. For example, the electronic device 700 stores one or more private keys and/or secret keys, as described with reference to FIGS. 1A and 1B, that encrypt scene data 706. In some embodiments, electronic device 700 transmits keys 708 to other devices 722, such as a network device or a second electronic device, as described with reference to FIGS. 1A and 1B. In some embodiments, memory 702 stores a public key used for encrypting and a private key used for decrypting scene data 706. In some embodiments, electronic device 700 transmits the private key to other devices 722 to be decrypted at the other devices 722.

In some embodiments, the electronic device 700 further includes one or more processors 710. Processors 710 can include graphics processing units (GPUs), central processing units (CPUs), microprocessors, microcontrollers, programmable logic device (PLD), field-programmable gate arrays (FPGAs), application specific integrated circuits (ASICs), digital signal processors (DSPs), or any suitable processing circuitry. The electronic device 700 can use processors 710 to perform any of the functions, processes, and/or methods described herein (e.g., optionally by executing instructions or programs stored in memory 702 and/or a non-transitory computer-readable storage medium).

In some embodiments, the electronic device 700 further includes an I/O interface 712. I/O interface 712 includes circuitry such as data lines, address lines, and control lines, for example, that enable communication between the electronic device 700 and one or more peripherals, such as display device 716, output device(s) 718, and input device(s) 720. Example display devices include, but are not limited to, monitors, television screens, touch screens, projectors, and/or head mounted displays implemented with LCD (liquid crystal display), LED (light emitting diode), OLED (organic light emitting diode), and/or other technology. Examples of other output device(s) 718 include, but are not limited to audio output devices (e.g., wired and/or wireless speakers and/or headphones), tactile output devices (e.g., haptic and/or vibration devices), and other visual output devices (e.g., indicator lights). Example input device(s) 720 include camera(s) (e.g., visible light cameras and/or infrared cameras), depth sensors (e.g., range sensors and/or LiDAR), trackpads, mouses, touch screens, microphones, keyboards, pedals, remote controls, and/or video game controllers.

In some embodiments, the electronic device 700 includes a transceiver 714. Transceiver 714 includes transmitter and/or receiver circuitry, including but not limited to signal generator(s), oscillator(s), modulator(s), encoder(s), amplifier(s), antenna(s), demodulator(s), filter(s), decoder(s), and/or tuner(s), for example. In some embodiments, the transceiver 714 is configured to communicate with other device(s) 722 (e.g., including the second electronic device described above with reference to FIGS. 1-6) using one or more protocols, including but not limited to, Bluetooth, Wi-Fi, Wi-Fi Direct, radio, cellular communication, satellite communication, and/or wired communication.

As described above, the components and configuration of components of electronic device 700 according to the disclosure are not limited by the example illustrated and described with reference to FIG. 7. In some embodiments, one or more of the components of the electronic device 700 included in FIG. 7 and any additional components of the electronic device 700 not shown in FIG. 7 are in communication with each other and/or integrated with each other. In some embodiments, additional or alternative components and/or configurations are possible.

FIG. 8 is an example block diagram of an electronic device 800 according to some embodiments of the disclosure. In some embodiments, the electronic device 800 includes memory 802, one or more processors 810, an I/O interface 812, and a transceiver 814. In some embodiments, the electronic device 800 includes instructions 804 which when executed by processors 810, can cause the electronic device 800 (or a computing system more generally) to perform one or more functions and methods of one or more examples of this disclosure, such as one or more of the methods described above with reference to FIGS. 1-6. Memory 802, instructions 804, one or more processors 810, an I/O interface 812, and a transceiver 814 are optionally in accordance with the memory, instructions, one or more processors, I/O interface, and transceiver discussed in FIG. 7. In some embodiments, the electronic device 800 includes additional or alternative components. In some embodiments, network device 110 is of the same architecture as electronic device 800. In some embodiments, network device 110 includes more, fewer, or different components than shown in the architecture as electronic device 800.

The embodiments of FIG. 8 share some similarities to the embodiment of FIG. 7, which are not repeated for brevity, but has some notable differences. For example, electronic device 800 may not include key(s) or a display device. In some embodiments, electronic device 800 optionally includes a display device 816. The display device 816 may be a display device that displays two-dimensional environments. For example, display device 816 may display two-dimensional user interfaces, unlike display device 716 that may display three-dimensional environments based on scene data. In some embodiments, display device 816 may display three-dimensional environments generated using scene data 806. Electronic device 800 may store and transmit data but may not include components to display or encrypt/decrypt data.

The present technology contemplates that the sharing of scene data can reduce compute cycles and thereby improve system performance and battery run-time. Technology implementors are reminded that entities for the collection, analysis, disclosure, transfer, storage, or other use of such scene data will comply with well-established privacy policies and/or privacy practices. In particular, scene data sharing between electronic devices should be performed in accordance with privacy practices meeting or exceeding applicable laws and/or industry standards. These privacy practices may include, but are not limited to, requiring user permission to share the data (e.g., opt-in) and/or permitting the user to opt-out of data sharing. In another example, users can select to limit the length of time that application scene data is maintained.

Scene data should be managed and handled in a way to minimize risk of unintentional or unauthorized access or use. Scene data may contain abstracted, semantic information about a physical environment (e.g., that there is a nearby horizontal plane), rather than photorealistic information (e.g., a picture of the table surface that is providing the planar surface). De-identification may be used, when appropriate, to remove specific identifiers such as address information, controlling the specificity of information stored (storing a nickname with the scene data or identifying the data at a city level rather than an address level). Further, the present technology contemplates that scene data shared may be limited to data representing a physical scene in which the sharing devices are co-located. Put another way, both the sending and the receiving devices are located in the actual physical environment scene that is represented by the scene data. Robust encryption and data anonymization can also be employed to further secure shared data.

According to the above, embodiments are directed to an electronic device comprising a camera configured to capture sensor data to create scene data, a display device, a memory, and one or more processors coupled to the camera, the display device, and the memory, the one or more processors configured to: in accordance with a determination that one or more criteria are satisfied including a criterion that is satisfied when a presence of a second electronic device associated with a second user different from a first user associated with the electronic device is detected, transmitting, to the second electronic device, the scene data, wherein transmitting the scene data enables the second electronic device to use the scene data in a communication session with the electronic device. Additionally or alternatively, in some embodiments, detecting the presence of the second electronic device further comprises detecting that the electronic device is in a communication session with the second electronic device. Additionally or alternatively, in some embodiments, detecting the presence of the second electronic device further comprises detecting that the electronic device is communicatively connected to the second electronic device via a wireless network. Additionally or alternatively, in some embodiments, detecting the presence of the second electronic device further comprises detecting that the electronic device is in physical proximity to the second electronic device. Additionally or alternatively, in some embodiments, the scene data further comprises plane data, and the one or more processors are further configured to use the plane data to display a virtual object in a three-dimensional environment at a location selected based on a horizontal or vertical plane of the scene data. Additionally or alternatively, in some embodiments, the scene data further comprises boundary data, and the one or more processors are further configured to use the boundary data to create a boundary in a three-dimensional environment generated using the scene data. Alternatively or additionally, in some embodiments, the one or more criteria further comprises receiving an indication to transmit the scene data in response to detecting the presence of the second electronic device. Alternatively or additionally, in some embodiments, transmitting the scene data further comprises transmitting a first portion of the scene data captured by the camera that is associated with a current location of the electronic device and the second electronic device without transmitting a second portion of the scene data captured by the camera that is associated with a location different from the current location of the electronic device and the second electronic device. Alternatively or additionally, in some embodiments, the scene data further comprises metadata configured to determine the portion of the scene data to transmit to the second electronic device based on semantic understanding of the scene data. Alternatively or additionally, in some embodiments, the one or more processors are further configured to receive, from the second electronic device, edited scene data, and in response to receiving the edited scene data from the second electronic device, updating the scene data in accordance with the edited scene data. Alternatively or additionally, in some embodiments, the one or more processors are further configured to, in accordance with the determination that the one or more criteria are satisfied, preventing the second electronic device from capturing sensor data to create second scene data. Alternatively or additionally, in some embodiments, the one or more processors are further configured to receive an indication in accordance with the second electronic device receiving the scene data. Alternatively or additionally, in some embodiments, the one or more processors are further configured to transmit menu data, music data, and/or home data to the second electronic device in accordance with the determination that one or more criteria are satisfied.

Some embodiments are directed to an electronic device comprising a camera configured to capture sensor data to create first scene data, a display device configured to display a three-dimensional environment generated using scene data including the first scene data, a memory, one or more processors coupled to the camera, the display device, and the memory, the one or more processors configured to: detect a presence of a second electronic device associated with a second user different from a first user associated with the electronic device, requesting second scene data different from the first scene data from the second electronic device, after requesting the second scene data from the second electronic device, receiving, from the second electronic device, the second scene data, and in response to receiving the second scene data from the second electronic device, displaying, using the display device, a second three-dimensional environment generated using the second scene data and a virtual object in the second three-dimensional environment, while in a communication session with the second electronic device, wherein the virtual object is displayed at a location in the three-dimensional environment that is selected based on the second scene data. Alternatively or additionally, in some embodiments, the one or more processors are further configured to: request menu data, music data, and/or home data from the second electronic device, and after requesting the menu data, music data, and/or home data from the second electronic device, receiving menu data, music data, and/or home data from the second electronic device. Alternatively or additionally, in some embodiments, receiving the second scene data further comprises receiving a first portion of scene data captured by the second electronic device without receiving a second portion of scene data captured by the second electronic device. Alternatively or additionally, in some embodiments, the camera is further configured to capture second sensor data to create edited second scene data, and the one or more processors are further configured to transmit the edited second scene data to the second electronic device. Alternatively or additionally, in some embodiments, the second scene data is received from a network device. Alternatively or additionally, in some embodiments, the one or more processors are further configured to delete the second scene data from the electronic device in response to no longer detecting the presence of the second electronic device. Alternatively or additionally, in some embodiments, the one or more processors are further configured to, in accordance with a determination that one or more criteria are satisfied, prevent the electronic device from capturing sensor data to create new scene data corresponding to the second scene data. Alternatively or additionally, in some embodiments, detecting the presence further comprises detecting that the electronic device is in a communication session with the second electronic device. Alternatively or additionally, in some embodiments, detecting the presence further comprises detecting that the electronic device is communicatively connected to the second electronic device via a wireless network. Alternatively or additionally, in some embodiments, detecting the presence further comprises detecting that the electronic device is in physical proximity to the second electronic device. Alternatively or additionally, in some embodiments, the scene data further comprises plane data and the one or more processors are further configured to use the plane data to display a virtual object in a three-dimensional environment at a location selected based on a horizontal or vertical plane of the scene data. Alternatively or additionally, in some embodiments, the scene data further comprises boundary data, and the one or more processors are further configured to use the boundary data to create a boundary in a three-dimensional environment generated using the scene data.

Some embodiments are directed to an electronic device comprising a memory, one or more processors coupled to the memory, the one or more processors configured to: receive scene data representing a scene from a first electronic device captured by a camera of the first electronic device, store the scene data, receive, from a second electronic device proximate to a location of the scene, a request to transmit the scene data to the second electronic device, in accordance with a determination that one or more criteria are satisfied, transmit the scene data to the second electronic device to be used in a communication session with another electronic device. Alternatively or additionally, in some embodiments, the electronic device further comprises a cloud network or an edge node. Alternatively or additionally, in some embodiments, the electronic device, the first electronic device, and the second electronic device share the same manufacturer. Alternatively or additionally, in some embodiments, transmitting the scene data further comprises transmitting a portion of the scene data captured by the camera that represents the scene captured at the location.

Some embodiments are directed to a non-transitory computer readable storage medium storing one or more programs, the one or more programs comprising instructions, which when executed by one or more processors of an electronic device, cause the electronic device to: in accordance with a determination that one or more criteria are satisfied including a criterion that is satisfied when a presence of a second electronic device associated with a second user different from a first user associated with the electronic device is detected, transmitting, to the second electronic device, the scene data, wherein transmitting the scene data enables the second electronic device to use the scene data in a communication session with the electronic device.

Some embodiments are directed to a method comprising: capturing sensor data to create scene data using a camera, and in accordance with a determination that one or more criteria are satisfied including a criterion that is satisfied when a presence of a second electronic device associated with a second user different from a first user associated with the electronic device is detected, transmitting, to the second electronic device, the scene data, wherein transmitting the scene data enables the second electronic device to use the scene data in a communication session with the electronic device.

Some embodiments are directed to a non-transitory computer readable storage medium storing one or more programs, the one or more programs comprising instructions, which when executed by one or more processors of a first electronic device, cause the electronic device to: detect a presence of a second electronic device associated with a second user different from a first user associated with the electronic device, request second scene data different from the first scene data from the second electronic device, after requesting the second scene data from the second electronic device, receiving, from the second electronic device, the second scene data; and in response to receiving the second scene data from the second electronic device, displaying, using the display device, a second three-dimensional environment generated using the second scene data and a virtual object in the second three-dimensional environment, while in a communication session with the second electronic device, wherein the virtual object is displayed at a location in the three-dimensional environment that is selected based on the second scene data.

Some embodiments are directed to a method comprising: capturing, using a camera, sensor data to create first scene data, displaying, using a display device, a three-dimensional environment generated using scene data including the first scene data, detecting a presence of a second electronic device associated with a second user different from a first user associated with the electronic device, requesting second scene data different from the first scene data from the second electronic device, after requesting the second scene data from the second electronic device, receiving, from the second electronic device, the second scene data, and in response to receiving the second scene data from the second electronic device, displaying, using the display device, a second three-dimensional environment generated using the second scene data and a virtual object in the second three-dimensional environment, while in a communication session with the second electronic device, wherein the virtual object is displayed at a location in the three-dimensional environment that is selected based on the second scene data.

Some embodiments are directed to a non-transitory computer readable storage medium storing one or more programs, the one or more programs comprising instructions, which when executed by one or more processors of a first electronic device, cause the electronic device to: receive scene data representing a scene from a first electronic device captured by a camera of the first electronic device, store the scene data, receive, from a second electronic device proximate to a location of the scene, a request to transmit the scene data to the second electronic device, and in accordance with a determination that one or more criteria are satisfied, transmitting the scene data to the second electronic device to be used in a communication session with another electronic device.

Some embodiments are directed to a method comprising: receiving scene data representing a scene from a first electronic device captured by a camera of the first electronic device, storing the scene data, receiving, from a second electronic device proximate to a location of the scene, a request to transmit the scene data to the second electronic device, and in accordance with a determination that one or more criteria are satisfied, transmitting the scene data to the second electronic device to be used in a communication session with another electronic device.

While some embodiments of the disclosure are described herein, additional and alternative embodiments are possible. Example embodiments are provided in the drawings and detailed description and are illustrative in nature. Modifications to the example embodiments are possible without departing from the scope of the disclosure.

The invention claimed is:

1. An electronic device comprising:

a camera configured to capture sensor data to create first scene data;

a display device configured to display a three-dimensional environment generated using scene data including the first scene data;

a memory;

one or more processors coupled to the camera, the display device, and the memory, the one or more processors configured to:

detect a presence of a second electronic device associated with a second user different from a first user associated with the electronic device;

request second scene data different from the first scene data from the second electronic device;

after requesting the second scene data from the second electronic device, receive, from the second electronic device, the second scene data, wherein receiving the second scene data further comprises:

receiving a first portion of the second scene data captured by the second electronic device corresponding to a first location associated with the electronic device and the second electronic device without receiving a second portion of the second scene data captured by the second electronic device corresponding to a second location, different than the first location; and in response to receiving the second scene data from the second electronic device, display, using the display device, a second three-dimensional environment generated using the second scene data and a virtual object in the second three-dimensional environment, wherein the virtual object is displayed at a location in the second three-dimensional environment that is selected based on the second scene data.

2. The electronic device of claim 1, wherein the one or more processors are further configured to:

request menu data, music data, and/or home data from the second electronic device; and after requesting the menu data, the music data, and/or the home data from the second electronic device, receiving the menu data, the music data, and/or the home data from the second electronic device.

3. The electronic device of claim 1, wherein receiving the second scene data further comprises receiving a portion of scene data related to a current location of the electronic device.

4. The electronic device of claim 1, wherein:

the camera is further configured to capture second sensor data to create edited second scene data; and the one or more processors are further configured to transmit the edited second scene data to the second electronic device.

5. The electronic device of claim 1, wherein the second scene data is received from a network device.

6. The electronic device of claim 1, wherein the one or more processors are further configured to delete the second scene data from the electronic device in response to no longer detecting the presence of the second electronic device.

7. The electronic device of claim 1, wherein detecting the presence further comprises detecting that the electronic device is in a communication session with the second electronic device.

8. The electronic device of claim 1, wherein detecting the presence further comprises detecting that the electronic device is communicatively connected to the second electronic device via a wireless network.

9. The electronic device of claim 1, wherein detecting the presence further comprises detecting that the electronic device is in physical proximity to the second electronic device.

10. The electronic device of claim 1, wherein the scene data further comprises plane data and the one or more processors are further configured to use the plane data to display a virtual object in a three-dimensional environment at a location selected based on a horizontal or vertical plane of the scene data.

11. The electronic device of claim 1, wherein the scene data further comprises boundary data, and the one or more processors are further configured to use the boundary data to create a boundary in a three-dimensional environment generated using the scene data.

12. The device of claim 1, wherein the second scene data include data to represent a physical environment used to generate the second three-dimensional environment.

13. A method comprising:

capturing, using a camera, sensor data to create first scene data;

displaying, using a display device, a three-dimensional environment generated using scene data including the first scene data;

detecting a presence of a second electronic device associated with a second user different from a first user associated with a first electronic device;

requesting second scene data different from the first scene data from the second electronic device;

after requesting the second scene data from the second electronic device, receiving, from the second electronic device, the second scene data;

in response to receiving the second scene data from the second electronic device, displaying, using the display device, a second three-dimensional environment generated using the second scene data and a virtual object in the second three-dimensional environment, while in a communication session with the second electronic device, wherein the virtual object is displayed at a location in the second three-dimensional environment that is selected based on the second scene data;

while displaying the second three-dimensional environment generated using the second scene data, detecting that one or more criteria are satisfied including a criterion that is satisfied when the second electronic device is no longer in the presence of the first electronic device; and in accordance with a determination that the one or more criteria are satisfied, deleting the second scene data from the second electronic device.

14. The method of claim 13, further comprising:

requesting menu data, music data, and/or home data from the second electronic device; and after requesting the menu data, the music data, and/or the home data from the second electronic device, receiving the menu data, the music data, and/or the home data from the second electronic device.

15. The method of claim 13, wherein receiving the second scene data further comprises receiving a first portion of scene data captured by the second electronic device without receiving a second portion of scene data captured by the second electronic device.

16. The method of claim 13, further comprising:

capturing, using the camera, second sensor data to create edited second scene data; and transmitting the edited second scene data to the second electronic device.

17. The method of claim 13, further comprising receiving the second scene data from a network device.

18. The method of claim 13, wherein the second scene data include data to represent a physical environment used to generate the second three-dimensional environment.

19. A non-transitory computer readable storage medium storing one or more programs, the one or more programs comprising instructions, which when executed by one or more processors of a first electronic device, cause the first electronic device to:

capture, via a camera, sensor data to create first scene data;

detect a presence of a second electronic device associated with a second user different from a first user associated with the first electronic device;

request second scene data different from first scene data from the second electronic device;

after requesting the second scene data from the second electronic device, receive, from the second electronic device, the second scene data, wherein receiving the second scene data further comprises:

receiving a first portion of the second scene data captured by the second electronic device corresponding to a first location associated with the first electronic device and the second electronic device without receiving a second portion of the second scene data captured by the second electronic device corresponding to a second location, different than the first location; and in response to receiving the second scene data from the second electronic device, display, using a display device, a second three-dimensional environment generated using the second scene data and a virtual object in the second three-dimensional environment, wherein the virtual object is displayed at a location in the second three-dimensional environment that is selected based on the second scene data.

20. The non-transitory computer readable storage medium of claim 19, wherein the instructions, when executed by the one or more processors of the first electronic device, further cause the first electronic device to:

request menu data, music data, and/or home data from the second electronic device; and after requesting the menu data, music data, and/or home data from the second electronic device, receiving menu data, music data, and/or home data from the second electronic device.

* * * * *